United States Patent
Allen et al.

(10) Patent No.: US 8,806,166 B2
(45) Date of Patent: *Aug. 12, 2014

(54) MEMORY ALLOCATION IN A MULTI-NODE COMPUTER

(75) Inventors: Kenneth R. Allen, Rochester, MN (US); Rebecca N. B. Legler, Rochester, MN (US); Kenneth C. Vossen, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 527 days.

This patent is subject to a terminal disclaimer.

(21) Appl. No.: 11/239,596

(22) Filed: Sep. 29, 2005

(65) Prior Publication Data

US 2007/0073992 A1    Mar. 29, 2007

(51) Int. Cl.
    *G06F 12/02*    (2006.01)
    *G06F 9/50*    (2006.01)
    *G06F 3/06*    (2006.01)

(52) U.S. Cl.
    CPC .......... *G06F 9/5033* (2013.01); *G06F 12/0223* (2013.01); *G06F 3/067* (2013.01)
    USPC .......................... 711/170; 711/148; 711/159

(58) Field of Classification Search
    CPC .... G06F 9/5033; G06F 12/0223; G06F 3/067
    USPC ................... 711/170, 173, 148, 159
    See application file for complete search history.

(56) References Cited

U.S. PATENT DOCUMENTS

| | | | |
|---|---|---|---|
| 4,718,008 A * | 1/1988 | Chang et al. .................. | 711/209 |
| 5,452,440 A * | 9/1995 | Salsburg ....................... | 711/136 |
| 6,167,490 A * | 12/2000 | Levy et al. .................... | 711/148 |
| 6,249,802 B1 | 6/2001 | Richardson et al. | |
| 6,336,177 B1 | 1/2002 | Stevens | |
| 7,350,050 B2 * | 3/2008 | Nakamura et al. ............ | 711/173 |
| 2002/0129115 A1 | 9/2002 | Noordergraaf et al. | |
| 2004/0019891 A1 * | 1/2004 | Koenen ........................ | 718/102 |
| 2004/0088498 A1 * | 5/2004 | Accapadi et al. ............. | 711/147 |
| 2004/0139287 A1 * | 7/2004 | Foster et al. .................. | 711/153 |
| 2004/0221121 A1 * | 11/2004 | Hamilton et al. ............. | 711/170 |
| 2005/0268064 A1 * | 12/2005 | Cohen et al. .................. | 711/170 |
| 2007/0073993 A1 | 3/2007 | Allen et al. | |

FOREIGN PATENT DOCUMENTS

JP        2005251184 A        9/2005

OTHER PUBLICATIONS

Kim, Seongbeom, Dhruba Chandra, and Yan Solihin. "Fair cache sharing and partitioning in a chip multiprocessor architecture." Proceedings of the 13th International Conference on Parallel Architectures and Compilation Techniques. IEEE Computer Society, 2004.*

Zhou, Pin, et al. "Dynamic tracking of page miss ratio curve for memory management." ACM SIGOPS Operating Systems Review. vol. 38. No. 5. ACM, 2004.*

(Continued)

*Primary Examiner* — Sanjiv Shah
*Assistant Examiner* — Samuel Dillon
(74) *Attorney, Agent, or Firm* — Biggers Kennedy Lenart Spraggins LLP

(57) ABSTRACT

Evaluating memory allocation in a multi-node computer including calculating, in dependence upon a normalized measure of page frame demand, a weighted coefficient of memory affinity, the weighted coefficient representing desirability of allocating memory from the node, and allocating memory may include allocating memory in dependence upon the weighted coefficient of memory affinity.

13 Claims, 8 Drawing Sheets

(56) References Cited

OTHER PUBLICATIONS

Verghese, Ben, et al. Operating system support for improving data locality on CC-NUMA compute servers. vol. 31. No. 9. ACM, 1996.*
Thiébaut, Dominique, Harold S. Stone, and Joel L. Wolf. "Improving disk cache hit-ratios through cache partitioning." Computers, IEEE Transactions on 41.6 (1992): 665-676.*
Office Action, U.S. Appl. No. 11/239,597, Jul. 25, 2007, pp. 1-20.
Office Action, U.S. Appl. No. 11/239,597, Jan. 16, 2008, pp. 1-13.
Final Office Action, U.S. Appl. No. 11/239,597, Jun. 27, 2008, pp. 1-14.
Mark Funk, "IBM eServer: Enhanced eServer iSeries Performance Memory Affinity," Jul. 2004, http://www-03.ibm.com/systems/resources/systems_i_advantages_perfmgmt_pdf_memaffin.pdf.

* cited by examiner

MEMORY ALLOCATION IN A MULTI-NODE COMPUTER

BACKGROUND OF THE INVENTION

1. Field of the Invention

The field of the invention is data processing, or, more specifically, methods, apparatus, and products for memory allocation in a multi-node computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer systems have become more sophisticated, computer design has become increasingly modular. Often computer systems are implemented with multiple modular nodes, each node containing one or more computer processors, a quantity of memory, or both processors and memory. Complex computer systems may include many nodes and sophisticated bus structures for transferring data among the nodes.

The access time for a processor on a node to access memory on a node varies depending on which node contains the processor and which node contains the memory to be accessed. A memory access by a processor to memory on the same node with the processor takes less time than a memory access by a processor to memory on a different node. Access to memory on the same node is faster because access to memory on a remote node must traverse more computer hardware, more buses, bus drivers, memory controllers, and so on, between nodes.

The level of computer hardware separation between nodes containing processors and memory is sometimes referred to as "memory affinity"—or simply as "affinity." In current computer systems, a node is considered to have the greatest memory affinity with itself because processors on the node can access memory on the node faster than memory on other nodes. Memory affinity between a node containing a processor and the node or nodes on which memory is installed decreases as the level of hardware separation increases.

Consider an example of a computer system characterized by the information in the following table:

| Node | Proportion of Processor Capacity | Proportion of Memory Capacity |
| --- | --- | --- |
| 0 | 50% | 50% |
| 1 | 50% | 5% |
| 2 | 0% | 45% |

The table describes a system having three nodes, nodes 0, 1, and 2, where proportion of processor capacity represents the processor capacity on each node relative to the entire system, and proportion of memory capacity represents the proportion of random access memory installed on each node relative to the entire system. An operating system may enforce affinity, allocating memory to a process on a processor only from memory on the same node with the processor. In this example, node 0 benefits from enforcement of affinity because node 0, with half the memory on the system, is likely to have plenty of memory to meet the needs of processes running on the processors of node 0. Node 0 also benefits from enforcement of memory affinity because access to memory on the same node with the processor is fast.

Not so for node 1. Node 1, with only five percent of the memory on the system is not likely to have enough memory to satisfy needs of processes running on the processors of node 1. In enforcing affinity, every time a process or thread of execution gains control of a processor on node 1, the process or thread is likely to encounter a swap of the contents of RAM out to a disk drive to clear memory and a load of the contents of the process's or thread's memory from disk, an extremely inefficient operation referred to as 'swapping' or 'thrashing.' Turning off affinity enforcement completely for memory on processors' local node may alleviate thrashing, but running with no enforcement of affinity also loses the benefit of affinity enforcement between processors and memory on well balanced nodes such as node 0 in the example above.

SUMMARY OF THE INVENTION

Methods, apparatus, and products are disclosed that reduce the risk of thrashing for memory allocation in a multi-node computer by evaluating memory affinity for a node in dependence upon page frame demand for page frames on the node and allocating memory in dependence upon the evaluation. Evaluating memory allocation in a multi-node computer according to embodiments of the present invention may include calculating, in dependence upon a normalized measure of page frame demand, a weighted coefficient of memory affinity, the weighted coefficient representing desirability of allocating memory from the node, and allocating memory may include allocating memory in dependence upon the weighted coefficient of memory affinity.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
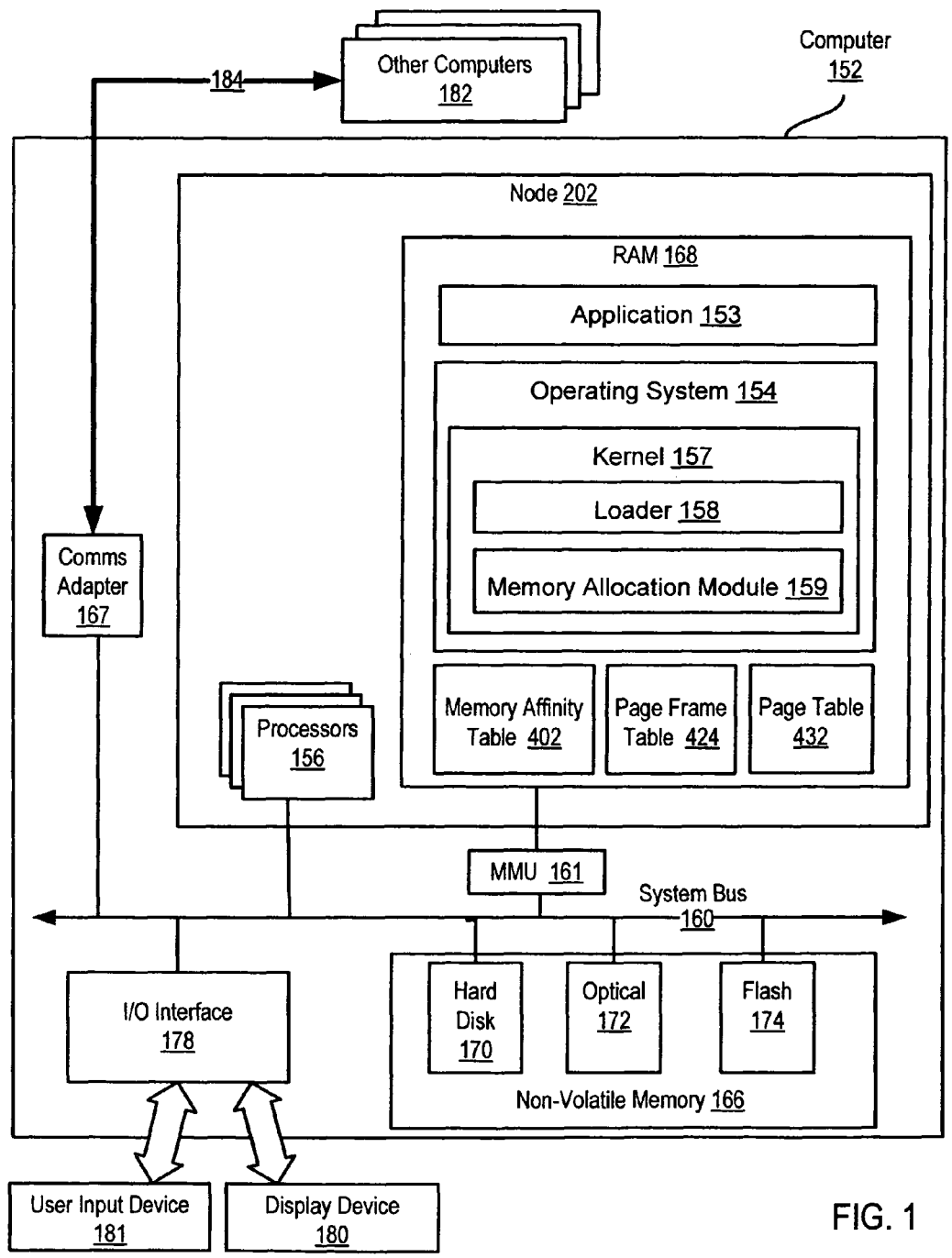
FIG. 1 sets forth a block diagram of automated computing machinery comprising an exemplary computer useful in memory allocation in a multi-node computer according to embodiments of the present invention.

Exemplary methods, apparatus, and products for memory allocation in a multi-node computer according to embodiments of the present invention are described with reference to the accompanying drawings, beginning with FIG. 1. Memory allocation in a multi-node computer in accordance with the present invention is generally implemented with computers, that is, with automated computing machinery. For further explanation, therefore, FIG. 1 sets forth a block diagram of automated computing machinery comprising an exemplary computer (152) useful in memory allocation in a multi-node computer according to embodiments of the present invention. The computer (152) of FIG. 1 includes at least one node (202). A node is a computer hardware module containing one or more computer processors, a quantity of memory, or both processors and memory. In this specification, a node containing one or more processors is sometimes referred to as a 'processor node,' and a node containing memory is sometimes referred to as a 'memory node.' A node containing both a quantity of memory and one or more processors, depending on context, may be referred to as either a processor node or a memory node. Node (202) of FIG. 1 includes at least one computer processor (156) or 'CPU' as well as random access memory (168) ('RAM') which is connected through memory management unit (161) and a system bus (160) to processor (156) and to other components of the computer. As a practical matter, systems for memory allocation in a multi-node computer according to embodiments of the present invention typically include more than one node, more than one computer processor, and more than one RAM circuit.

Stored in RAM (168) is an application program (153), computer program instructions for user-level data processing. Also stored in RAM (168) is an operating system (154). Operating systems useful in computers according to embodiments of the present invention include UNIX™, Linux™, Microsoft XP™, AIX™, IBM's i5/OS™, and others as will occur to those of skill in the art. Operating system (154) contains a core component called a kernel (157) for allocating system resources, such as processors and physical memory, to instances of an application program (153) or other components of the operating system (154). Operating system (154) including kernel (157), in the method of FIG. 1, is shown in RAM (168), but many components of such software typically are stored in non-volatile memory (166) also.

The operating system (154) of FIG. 1 includes a loader (158). Loader (158) is a module of computer program instructions that loads an executable program from a load source such, for example, as a disk drive, a tape, or network connection and creates a running instance of the executable program called a 'process.' The loader reads and interprets the metadata of an executable file, allocates memory to the process, loads code and data segments of the executable file into memory, and registers the process with a scheduler in the operating system for execution, typically by placing an identifier for the new process in a scheduler's ready queue. In this example, the loader (158) is a module of computer program instructions improved according to embodiments of the present invention to allocate memory in a multi-node computer by evaluating memory affinity for a node in dependence upon page frame demand for page frames on the node and allocating memory in dependence upon the evaluation.

Page frame demand is the memory allocation requirement of processes for random access memory, that is, page frames, for use by the processes. Page frames are allocated by mapping free frames to pages of virtual memory in a page table associated with a process executing on a processor. Page frame demand, therefore, may be measured generally by measuring the activities that map page frames of physical memory to pages of virtual memory, such as, for example, counting pages faults, page swaps, or page outs.

The operating system (154) of FIG. 1 includes a memory allocation module (159). Memory allocation module (159) of FIG. 1 is a module of computer program instructions that provides an application programming interface ('API') through which application programs and other components of the operating system may dynamically allocate, reallocate, or free previously allocated memory. Function calls to the API of the memory allocation module (159), such as, for example, 'malloc( )', 'realloc( )', and 'free( )', satisfy dynamic memory allocation requirements during program execution. In this example, the memory allocation module (159) is a module of computer program instructions improved according to embodiments of the present invention to allocate memory in a multi-node computer by evaluating memory affinity for a node in dependence upon page frame demand for page frames on the node and allocating memory in dependence upon the evaluation.

Also stored in RAM (168) is a page table (432) that maps the virtual memory address space of computer system to the physical memory address space in the system of FIG. 1. The virtual memory address space is broken into fixed-size blocks called 'pages,' while the physical memory address space is broken into blocks of the same size called 'page frames.' The virtual memory address space provides threads of a process with a block of memory in which to reside that may be much larger than the actual amount of physical memory installed in the computer system. While the threads of a process reside in segments of contiguous virtual memory, the actual physical memory containing instructions and data of a process may be fragmented throughout the physical memory space. When a reference to a page of virtual memory occurs during execution of a thread, memory management unit (161) looks up the corresponding page frame of physical memory in a page table (432) associated with the program making the reference. In associating page table (432) of FIG. 1 with a process, some operating systems maintain a page table (432) for each process, while other operating systems may assign each process a portion of one large page table (432) maintained for an entire system.

Upon creating, expanding, or modifying a page table (432) for a process, the operating system (154) allocates page frames of physical memory to the pages in the page table (432). The operating system (154) locates unallocated page frames to assign to the page table (432) through a page frame table (424). Page frame table (424) is stored in RAM (168) and represents information regarding page frames of physical memory in the system of FIG. 1. In associating the page frame table (424) of FIG. 1 with page frames of memory on a node, some operating systems may maintain a page frame table (424) for each node that contains a list of all the unallocated page frames on the node, while other operating systems may maintain one large page frame table (424) for the entire system that contains information on all page frames in all nodes. Page frame table (424) indicates whether a page frame is mapped to a page in the virtual memory space. Page frames not mapped to pages are unallocated and, therefore, available when a process requires a memory allocation for storing code and data.

Also stored in RAM (168) is a memory affinity table (402) representing evaluations of memory affinity between processor nodes and memory nodes. Memory affinity is a measure of the desirability of allocating memory from a memory node to a process running on a processor node. High evaluations of memory affinity may exist between processor nodes and memory nodes in close physical proximity because data written to or read from a node of high memory affinity with a processor node traverses less computer hardware, fewer memory controllers, and fewer bus drivers in traveling to or from such a high affinity memory node. In addition, memory affinity may be evaluated highly for memory nodes with relatively low page frame demand. For example, a memory node with a lower page frame demand than another memory node with a similar physical proximity to a processor node may have a higher evaluation of memory affinity than the other memory node with respect to the processor node. This example is for explanation and not limitation. In fact, a memory node with a lower page frame demand than another memory node may be assigned a higher evaluation of memory affinity than the other memory node regardless of physical proximity to a processor node.

Computer (152) of FIG. 1 includes non-volatile computer memory (166) coupled through a system bus (160) to processor (156) and to other components of the computer (152). Non-volatile computer memory (166) may be implemented as a hard disk drive (170), optical disk drive (172) electrically erasable programmable read-only memory space (so-called 'EEPROM' or 'Flash' memory) (174), RAM drives (not shown), or as any other kind of computer memory as will occur to those of skill in the art. Page table (432), page frame table (424), memory affinity table (402), operating system (154), and application program (153) in the system of FIG. 1 are shown in RAM (168), but many components of such software typically are stored in non-volatile memory (166) also.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 1 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 2:
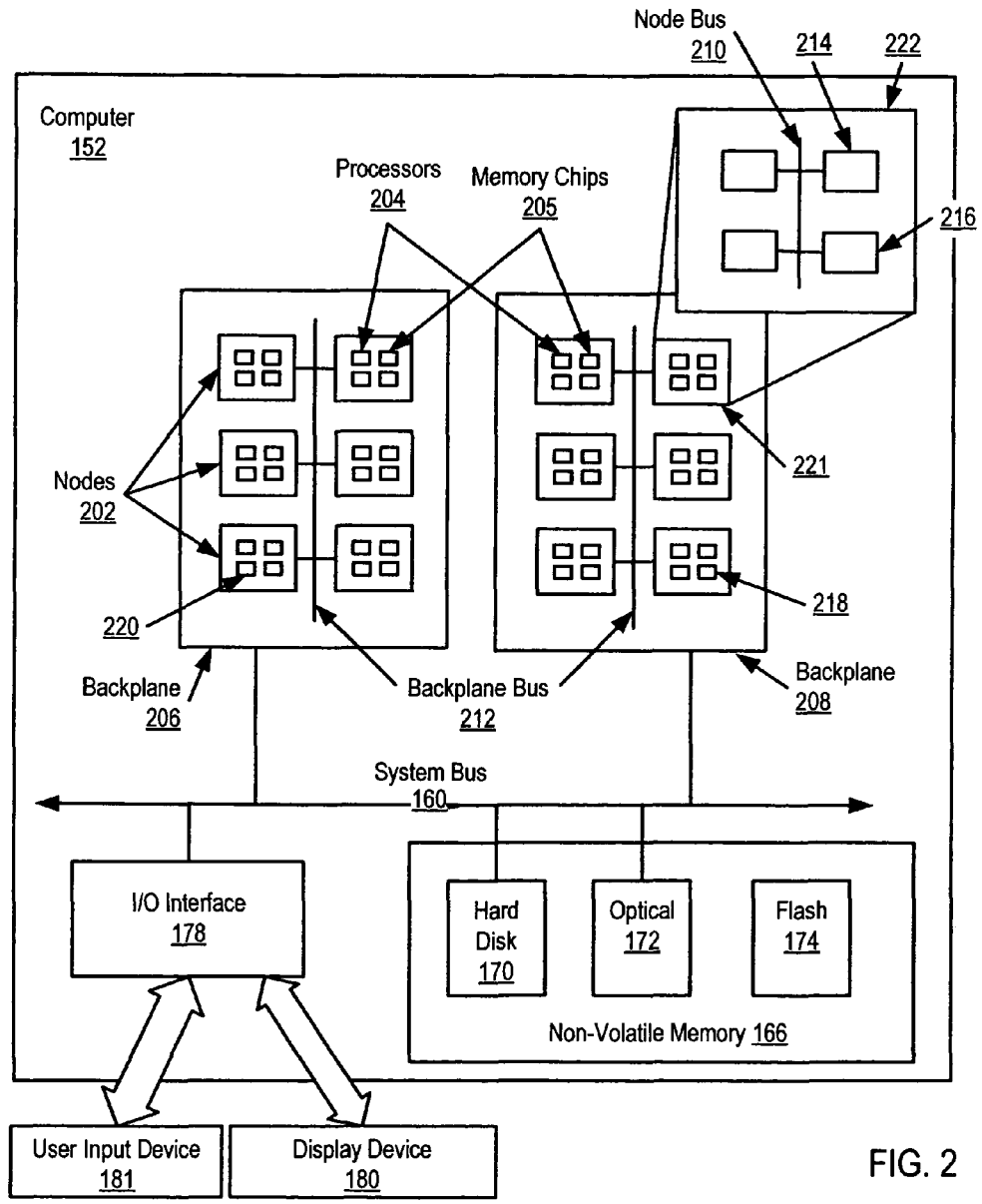
FIG. 2 sets forth a block diagram of a further exemplary computer for memory allocation in a multi-node computer.

For further explanation, FIG. 2 sets forth a block diagram of a further exemplary computer (152) for memory allocation in a multi-node computer. The system of FIG. 2 includes random access memory implemented as memory integrated circuits referred to as 'memory chips' (205) included in nodes (202) installed on backplanes (206), with each backplane coupled through system bus (160) to other components of computer (152). The nodes (202) may also include computer processors (204), also in the form of integrated circuits installed on a node. The nodes on the backplanes are coupled for data communications through backplane buses (212), and the processor chips and memory chips on nodes are coupled for data communications through node buses, illustrated at reference (210) on node (222), which expands the drawing representation of node (221).

A node may be implemented, for example, as a multi-chip module ('MCM'). An MCM is an electronic system or subsystem with two or more bare integrated circuits (bare dies) 'chip-sized packages' assembled on a substrate. In the method of FIG. 2, the chips in the MCMs are computer processors and computer memory. The substrate may be a printed circuit board or a thick or thin film of ceramic or silicon with an interconnection pattern, for example. The substrate may be an integral part of the MCM package or may be mounted within the MCM package. MCMs are useful in computer hardware architectures because they represent a packaging level between application-specific integrated circuits ('ASICs') and printed circuit boards. The nodes of FIG. 2 illustrate levels of hardware memory separation or memory affinity. A processor (214) on node (222) may access physical memory:

in a memory chip (216) on the same node with the processor (214) accessing the memory chip, in a memory chip (218) on another node on the same backplane (208), or in a memory chip (220) on another node on another backplane (206).

Memory chip (216) is referred to as 'local' with respect to processor (214) because memory chip (216) is on the same node as processor (214). Memory chips (218) and (220) however are referred to as 'remote' with respect to processor (214) because memory chips (218) and (220) are on different nodes than processor (214).

Accessing remote memory on the same backplane takes longer than accessing local memory. Data written to or read from remote memory by a processor traverses more computer hardware, more memory controllers, and more bus drivers in traveling to or from the remote memory. Accessing memory remotely on another backplane takes even longer—for the same reasons.

It is useful to note for purposes of explanation that a processor node may be viewed, without regard to page frame demand, as having the highest memory affinity with itself because local memory provides the fastest available memory access. The fast access times involved when storing or retrieving data on local memory may increase the desirability of allocating memory from the same node that contains the processor running a process requesting a memory access.

A processor node may not have the highest memory affinity with itself, however, when evaluation of memory affinity includes page frame demand. If a node containing a processor has only a small quantity of installed memory, has few unallocated page frames, or for some other reason experiences relatively high page frame demand, such a processor node may have higher memory affinity for another node than for itself.

The computer architecture so described for the computer system of FIG. 2 is for explanation, not for limitation of the present invention. Other architectures as will occur to those of skill in the art may be useful also for implementing memory allocation in multi-node computers. Memory allocation in multi-node computers may be implemented according to embodiments of the present invention, for example, with several nodes installed upon printed circuit boards with the printed circuit boards plugged into backplanes, thereby creating an additional level of memory affinity not illustrated in FIG. 2. Other architectures as will occur to those of skill in the art may be useful also for implementing memory allocation in multi-node computers, and all such architectures are well within the scope of the present invention.

Figure 3:
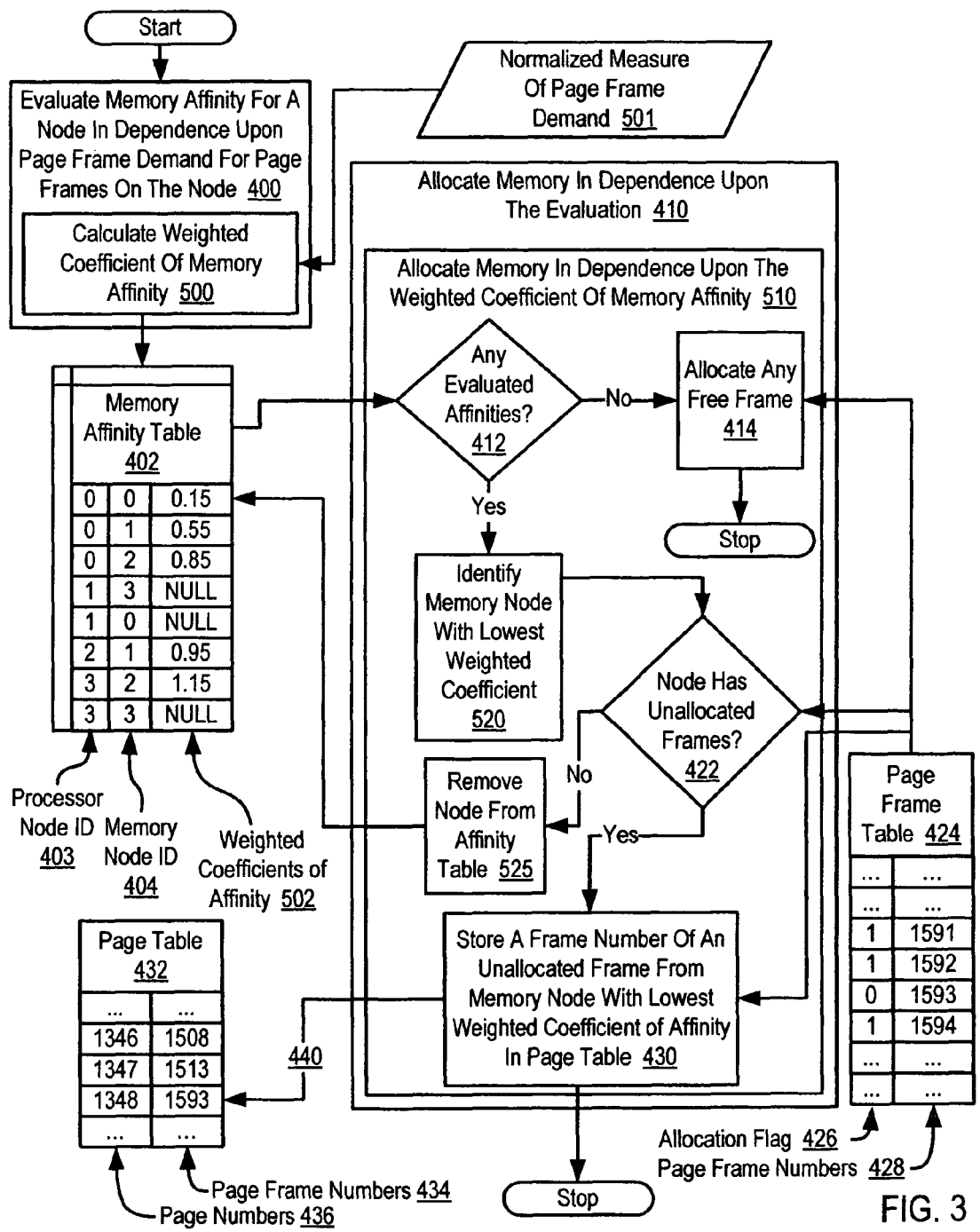
FIG. 3 sets forth a flow chart illustrating an exemplary method for memory allocation in a multi-node computer according to embodiments of the present invention that includes evaluating memory affinity for a node in dependence upon page frame demand for page frames on the node and allocating memory in dependence upon the evaluation.

For further explanation, FIG. 3 sets forth a flow chart illustrating an exemplary method for memory allocation in a multi-node computer according to embodiments of the present invention that includes evaluating (400) memory affinity for a node in dependence upon page frame demand for page frames on the node and allocating (410) memory in dependence upon the evaluation.

In the method of FIG. 3, evaluating (400) memory affinity for a node in dependence upon page frame demand for page frames on the node includes calculating (500) a weighted coefficient (502) of memory affinity. The weighted coefficient (502) of memory affinity represents desirability of allocating memory from a node. In the method of FIG. 3, calculating (500) a weighted coefficient (502) of memory affinity is carried out in dependence upon a normalized measure (501) of page frame demand. As mentioned above, page frame demand is the memory allocations requirement of processes for page frames for use by the processes and may be measured generally by measuring, within a predetermined time period, activities that map page frames of physical memory to pages of virtual memory. A normalized measure (501) of page frame demand may be calculated as the page frame demand for page frames of a node that occurs within a predetermined interval multiplied by a normalizing factor such as, for example, the proportion of memory installed on other nodes relative to the memory installed on all the nodes of the system. Page frame demand may be characterized with page faults, page swaps, page outs, and in other ways as will occur to those of skill in the art.

Calculating (500), in dependence upon a normalized measure (501) of page frame demand, a weighted coefficient (502) of memory affinity according to the method of FIG. 3 may be carried out by storing the weighted coefficients of memory affinity (502) in a memory affinity table such as the one illustrated at reference (402). Each record of memory affinity table (402) specifies a weighted coefficient of memory affinity (502) of a memory node (404) to a processor node (403). As illustrated, processor node 0 has a coefficient of memory affinity of 0.15 to memory node 0, that is, processor node 0's coefficient of memory affinity with itself is 0.15. Processor node 0's coefficient of memory affinity to memory node 1 is 0.55. And so on.

The evaluations of memory affinity (502) in the memory affinity table (402) are weighted coefficients of memory affinity (502). Lower weighted coefficients of memory affinity (502) represent higher evaluations of memory affinity. A weighted coefficient of 0.35 represents a higher evaluation of memory affinity than a weighted coefficient of 0.65; a weighted coefficient of 0.65 represents a higher evaluation of memory affinity than a weighted coefficient of 1.25; and so on, with the lowest weighted coefficient of memory affinity corresponding to the memory node with the highest evaluation of memory affinity to a processor node and the highest weighted coefficient of memory affinity corresponding to the memory node with the lowest evaluation of memory affinity to a processor node.

An absence of an evaluated memory affinity in this example is represented by a null entry for memory affinity (502) in table (402). For completeness, memory affinity among all nodes of a system are represented in table (402), but there is no meaningful representation of memory affinity between a processor node and another node that has no memory installed upon it. Such a relationship of no meaningful memory affinity is represented by a null entry for memory affinity between two nodes. In this example, there is no evaluated memory affinity, indicated by a 'null' entry, between processor node 1 and memory node 3. Such a null entry may exist because a processor node has such a large proportions of system memory that it needs no memory from other nodes, because a 'memory node' labeled a 'memory node' for purposes of explanation, in fact contains no memory, and for other reasons as will occur to those of skill in the art.

The method of FIG. 3 continues by allocating (410) memory in dependence upon the evaluation of memory affinity. In this example, the evaluation of memory affinity is represented by weighted coefficients of memory affinity (502) in table (402). Allocating (410) memory in dependence upon the evaluation of memory affinity according to the method of FIG. 3 includes allocating (510) memory in dependence upon a weighted coefficient of memory affinity. In the method of FIG. 3, allocating (510) memory in dependence upon the weighted coefficient of memory affinity includes determining (412) whether there are any memory nodes in the system having evaluated affinities to a processor node, that is, to a processor node for which memory is to be allocated. In the example of FIG. 3, determining (412) whether there are any memory nodes in the system having evaluated affinities to a processor node may be carried out by determining whether there are evaluated affinities in the table for the particular processor node to which memory is to be allocated, that is, whether there are any non-null entries in table (402).

If there are no memory nodes in the system having evaluated affinities with the processor node, the method of FIG. 3 includes allocating (414) any free page frame available anywhere on the system regardless of memory affinity. Processor node 1 in memory affinity table (402), for example, has no evaluated affinities to memory nodes, indicated by null values in column (502) for each entry for processor node 1 in table (402), so that allocations of memory to processor node 1 may be from any free page frames anywhere in system memory regardless of location.

If there are memory nodes in the system having evaluated affinities with the processor node, the method of FIG. 3 continues by identifying (520) the memory node with the lowest weighted coefficients (502) of memory affinity, and, if that node has unallocated page frames, allocating memory from that node by storing (430) a page frame number (428) of a page frame of memory from that memory node in page table (432). As explained above, lower weighted coefficients of memory affinity (502) represent higher evaluations of memory affinity. Each record of page table (432) associates a page number (436) and a page frame number (434). According to the method of FIG. 3, page frame number '1593' representing a page frame from a memory node with the lowest weighted coefficient (502) of memory affinity has been allocated to page number '1348' in page table (432) as indicated by arrow (440).

If the memory node having the lowest weighted coefficient of memory affinity (502) has no unallocated page frames, the method of FIG. 3 continues by removing (525) the entry for that node from the memory affinity table (402) and loops again determining (412) whether there are memory nodes in the system having evaluated affinities with the processor node, identifying (520) the memory node with lowest weighted coefficient of memory affinity (502), and so on.

Whether the node with lowest weighted coefficient of memory affinity (502) has unallocated page frames may be determined (422) by use of a page frame table, such as, for example, the frame table illustrated at reference (424) in FIG. 3. Each record in page frame table (424) represents a memory frame identified by page frame number (428) and specifies by an allocation flag (426) whether the page frame is allocated. An allocated page frame has the associated allocation flag set to '1,' and a free page frame's allocation flag is reset to '0.' Allocating a page frame from such a page frame table (424) includes setting the page frame's allocation flag to '1.' In the page frame table (424) of FIG. 3, page frame numbers '1591,' '1592,' and '1594' are allocated. Page frame number '1593' however remains unallocated.

An alternative form of page frame table may be implemented as a 'free page frame table' containing only page frame numbers of page frames free to be allocated. Allocating a page frame from a free page frame table includes deleting the page frame number of the allocated page frame from the free page frame table. Other forms of page frame table, ways of indicating free and allocated page frames, may occur to those of skill in the art, and all such forms are well within the scope of the present invention.

Figure 4:
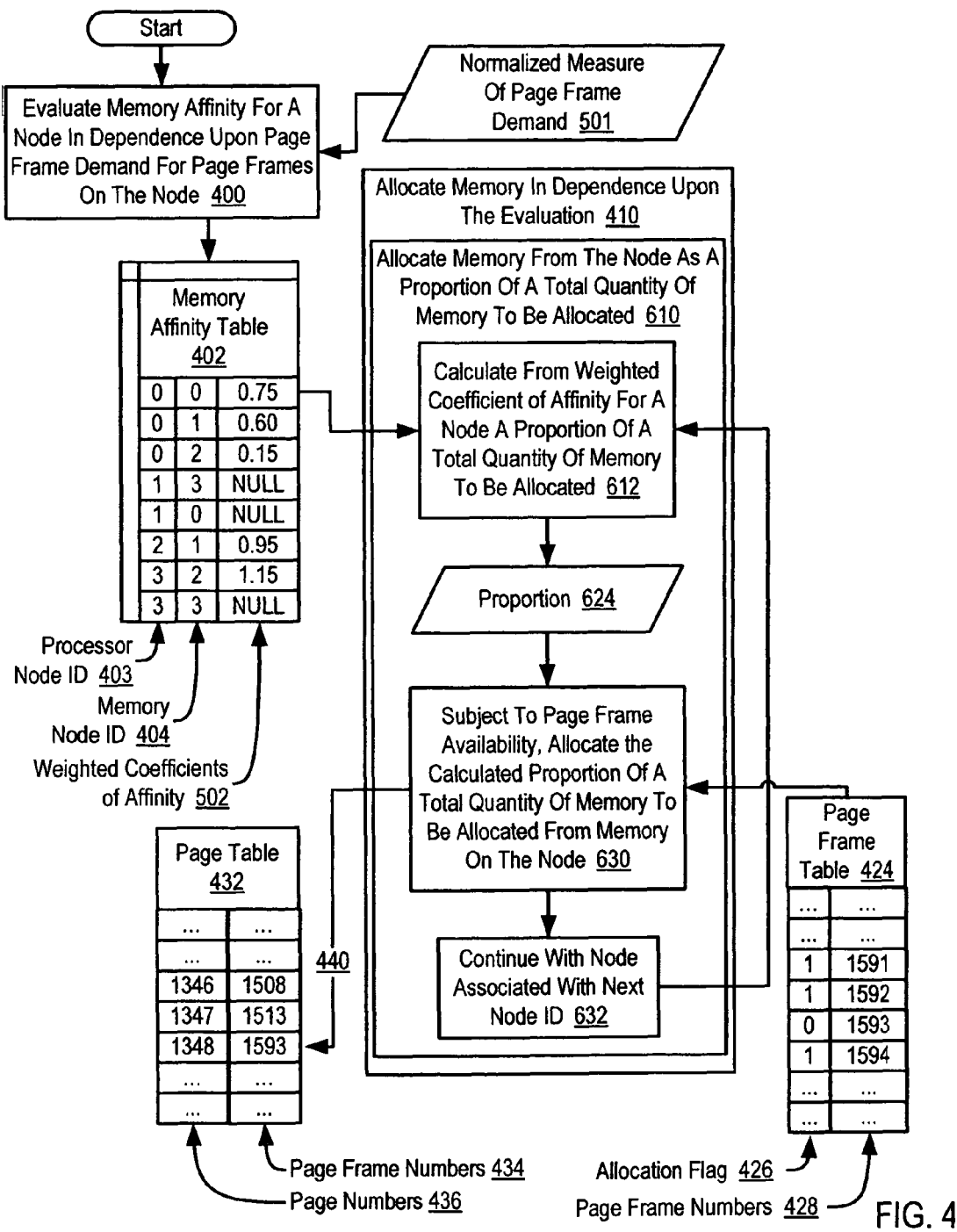
FIG. 4 sets forth a flow chart illustrating a further exemplary method for memory allocation in a multi-node computer according to embodiments of the present invention.

For further explanation, FIG. 4 sets forth a flow chart illustrating a further exemplary method for memory allocation in a multi-node computer according to embodiments of the present invention that includes evaluating (400) memory affinity for a node in dependence upon page frame demand for page frames on the node and allocating (410) memory in dependence upon the evaluation. As explained above with regard to the method of FIG. 3, evaluating (400) memory affinity for a node in dependence upon page frame demand for page frames on the node according to the method of FIG. 4 may be carried out by calculating, in dependence upon a normalized measure of page frame demand (501), a weighted coefficient (502) of memory affinity, the weighted coefficient (502) representing desirability of allocating memory from the node and storing the weighted coefficients of memory affinity (502) in a memory affinity table (402). Each record of memory affinity table (402) specifies an evaluation (502) of memory affinity for a memory node (404) to a processor node (403). The evaluations of memory affinity (502) in the memory affinity table (402) are weighted coefficients of memory affinity that indicate a proportion of a total quantity of memory to be allocated.

The method of FIG. 4 also includes allocating (410) memory in dependence upon the evaluation of memory affinity, that is, in dependence upon the weighted coefficients of memory affinity (502). Allocating (410) memory in dependence upon the evaluation according to the method of FIG. 4 includes allocating (610) memory from a node as a proportion of a total quantity of memory to be allocated. Allocating (610) memory from a node as a proportion of a total quantity of memory to be allocated may be carried out by allocating memory from a node as a proportion of a total quantity of memory to be allocated to a processor node. A total quantity of memory to be allocated may be identified as a predetermined quantity of memory for allocation such as, for example, the next 5 megabytes to be allocated.

Allocating (610) memory from a node as a proportion of a total quantity of memory to be allocated according to the method of FIG. 4 includes calculating (612) from a weighted coefficient of memory affinity (502) for a node a proportion (624) of a total quantity of memory to be allocated. A proportion (624) of a total quantity of memory to be allocated from memory nodes having evaluated affinities may be calculated as the total quantity of memory to be allocated times the ratio of a value of a weighted coefficient of memory affinity (502) for a memory node for a processor node to a total value of all weighted coefficients of memory affinity (502) for memory nodes having evaluated affinities for the processor node. For processor node 0 in table (402), for example, the total of all weighted coefficients of memory affinity for memory nodes having evaluated affinities with processor node 0 (that is, for memory nodes 0, 1, and 2 is 1.5. Using a total quantity of memory to be allocated of 5 megabytes in the example of in FIG. 4, the proportion (624) of a total quantity of memory to be allocated from memory of the nodes associated with memory nodes 0, 1, and 2 respectively may be calculated as:

(0.75 evaluated memory affinity for node 0)÷(1.5 total evaluated memory affinity)×5 MB=2.5 MB    Node 0

(0.60 evaluated memory affinity for node 1)÷(1.5 total evaluated memory affinity)×5 MB=2.0 MB    Node 1

(0.15 evaluated memory affinity for node 0)÷(1.5 total evaluated memory affinity)×5 MB=0.5 MB    Node 2

In this example, allocating (610) memory from a node as a proportion of a total quantity of memory of 5 MB to be allocated according to the method of FIG. 4 may be carried out by allocating the next 5 MB for processor node 0 by allocating the first 2.5 MB of the 5 MB allocation from node 0, the next 2.0 MB from node 1, and the final 0.5 MB of the 5 MB allocation from node 2. All such allocations are subject to availability of page frames in the memory nodes. In particular in the example of FIG. 4, allocating (610) memory from a node as a proportion of a total quantity of memory to be allocated also includes allocating (630) the proportion (624) of a total quantity of memory to be allocated from memory on the node, subject to page frame availability. Whether unallocated page frames exist on a memory node may be determined by use of page frame table (424). Page frame table (424) associates page frame numbers (428) for page frames in memory nodes with allocations flags (426) that indicate whether a page frame of memory is allocated.

Allocating (630) the proportion (624) of a total quantity of memory according to the method of FIG. 4 may include calculating the number of page frames needed to allocate the proportion (624) of a total quantity of memory to be allocated. Calculating the number of page frames needed may be accomplished by dividing the page frame size into the proportion (624) of the total quantity of memory to be allocated. Continuing the example calculation above, where the total of all weighted coefficients of memory affinity for memory nodes having evaluated affinities for processor node 0 is 1.5, the total quantity of memory to be allocated is 5 megabytes, the proportion of the total quantity of memory to be allocated from nodes 0, 1, and 2 respectively is 2.5 MB, 2.0 MB, and 0.5 MB, and the page frame size is taken as 2 KB, then the number of page frames to be allocated from nodes 0, 1, and 2 may be calculated as:

2.5 MB÷2 KB/page frame=1280 page frames    Node 0

2.0 MB÷2 KB/page frame=1024 page frames    Node 1

0.5 MB÷2 KB/page frame=256 page frames    Node 2

Allocating (630) the calculated proportion (624) of a total quantity of memory according to the method of FIG. 4 may also be carried out by storing the page frame numbers (428) of all unallocated page frames from a memory node up to and including the number of page frames needed to allocate the calculated proportion (624) of a total quantity of memory to be allocated from memory nodes into page table (432) of a process running on a processor node. Each record of page table (432) of FIG. 4 associates a page frame number (434) of a page frame on a memory node with a page number (436) in the virtual memory space allocated to a process running on a processor node. In the example of FIG. 4, therefore, page frame number '1593' representing a page frame from a memory node with the lowest weighted coefficient of memory affinity (502) has been allocated to page number '1348' in page table (432) as indicated by arrow (440).

After allocating the number of page frames needed to allocate the proportion (624) of a total quantity of memory to be allocated from the memory node, or after allocating all unallocated page frames from a memory node, whichever comes first, the method of FIG. 4 continues (632) by looping to the next entry in the memory affinity table (402) associated with a memory node and, again, calculating (612) from a weighted coefficient of memory affinity (502) for a node a proportion of a total quantity of memory to be allocated, allocating (630) the proportion (624) of a total quantity of memory to be allocated from memory on the node, subject to page frame availability, and so on until allocation, subject to page frame availability, of the proportion (624) of a total quantity of memory to be allocated for each memory node with an evaluated memory affinity (502) for the processor node for which a quantity of memory is to be allocated occurs. Upon allocating, subject to page frame availability, the proportion (624) of a total quantity of memory to be allocated for each memory node with an evaluated memory affinity (502) for the processor node for which a quantity of memory is to be allocated, any portion of the total number of allocations remaining unallocated may be satisfied according to the method of FIG. 4 from memory anywhere on the system regardless of memory affinity.

Figure 5:
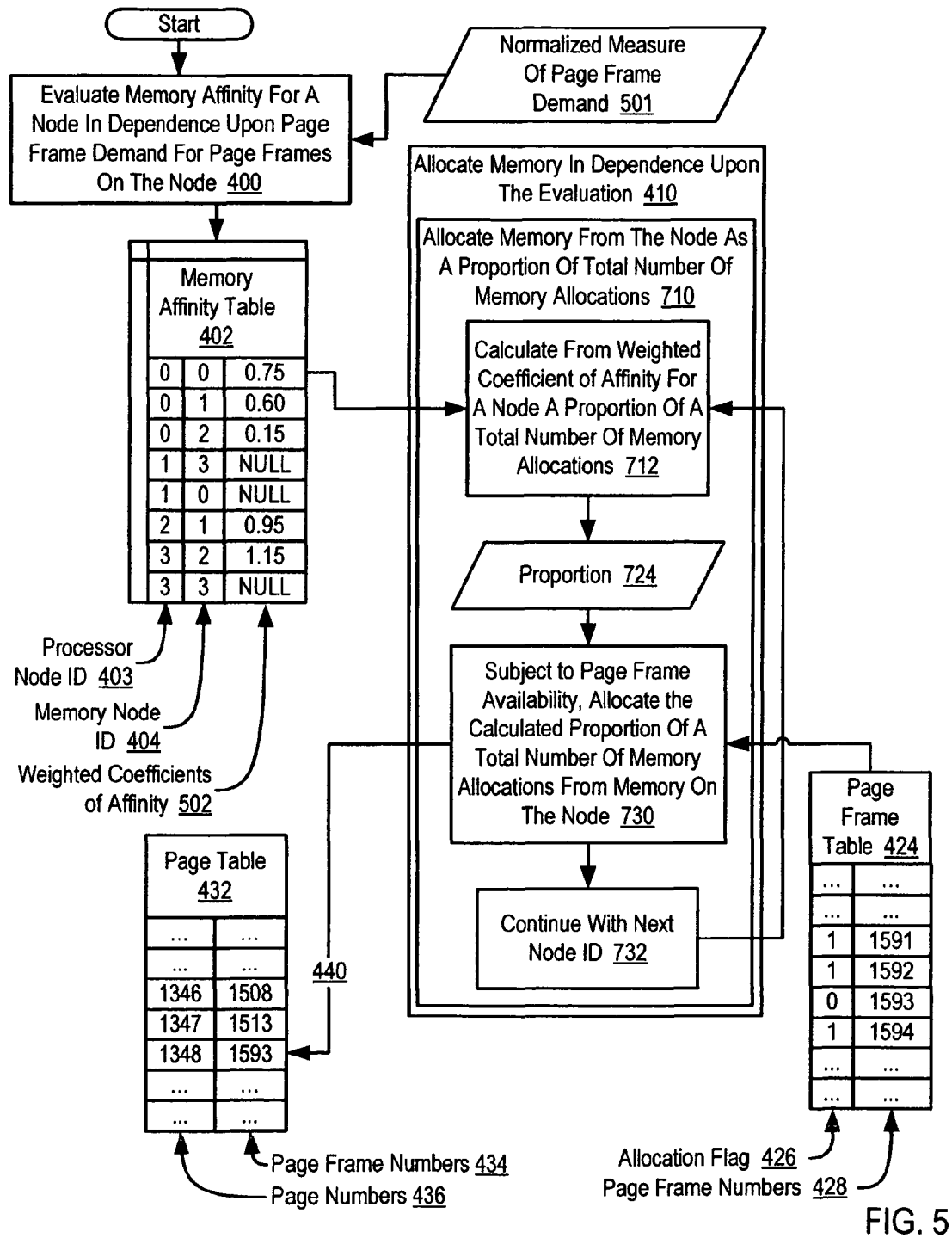
FIG. 5 sets forth a flow chart illustrating a further exemplary method for memory allocation in a multi-node computer according to embodiments of the present invention.

For further explanation, FIG. 5 sets forth a flow chart illustrating a further exemplary method for memory allocation in a multi-node computer according to embodiments of the present invention that includes evaluating (400) memory affinity for a node in dependence upon page frame demand for page frames on the node and allocating (410) memory in dependence upon the evaluation. As explained above with regard to the method of FIG. 3, evaluating (400) memory affinity among nodes according to the method of FIG. 5 may be carried out by calculating a weighted coefficient of memory affinity (502) for each memory node for each processor node based on system parameters and storing the weighted coefficients of memory affinity (502) in a memory affinity table (402). Each record of memory affinity table (402) specifies an evaluation (502) of memory affinity for a memory node (404) to a processor node (403). The evaluations of memory affinity (502) in the memory affinity table (402) are weighted coefficients of memory affinity (502) that indicate a proportion of a total number of memory allocations to be allocated from memory nodes for a processor node, that is, to processes running on a processor node.

The method of FIG. 5 also includes allocating (410) memory in dependence upon the evaluations of memory affinity, that is, in dependence upon the weighted coefficients of memory affinity (502). Allocating (410) memory in dependence upon the evaluations according to the method of FIG. 5 includes allocating (710) memory from a node as a proportion of a total number of memory allocations. Allocating (710) memory from a node as a proportion of a total number of memory allocations may be carried out by allocating memory from a node as a proportion of a total number of memory allocations to a processor node. According to the method of FIG. 5, the total number of memory allocations may be identified as a predetermined number of memory allocations such as, for example, the next 500 allocations of memory for a processor node, that is, the next 500 allocations to processes running on a processor node.

Allocating (710) memory from a node as a proportion of a total number of memory allocations according to the method of FIG. 5 includes calculating (712) from a weighted coefficient of memory affinity (502) for a node a proportion (724) of a total number of memory allocations. A proportion (724) of a total number of memory allocations from memory nodes having evaluated affinities may be calculated as the total number of memory allocations times the ratio of a value of a weighted coefficient of memory affinity (502) for a memory node for a processor node to a total value of all weighted coefficients of memory affinity (502) for memory nodes having evaluated affinities for the processor node. For processor node 0 in table (402), for example, the total of all weighted coefficients of affinities for memory nodes having evaluated affinities with processor node 0 (that is, for memory nodes 0, 1, and 2) is 1.5. Using a total number of memory allocations of 500 allocations in the example of FIG. 5, the proportion (724) of a total number of memory allocations to processor node 0 from memory nodes 0, 1, and 2 respectively may be calculated as:

(0.75 evaluated memory affinity for node0)÷(1.5 total evaluated memory affinity×500 allocations=250 allocations                                Node 0

(0.60 evaluated memory affinity for node 1)÷(1.5 total evaluated memory affinity×500 allocations=200 allocations                                Node 1

(0.15 evaluated memory affinity for node 0)÷(1.5 total evaluated memory affinity×500 allocations=50 allocations                                Node 2

In this example, allocating (710) memory from a node as a proportion of a total number of 500 memory allocations according to the method of FIG. 5 may be carried out by allocating the next 500 allocations for processor node 0 by allocating the first 250 of the 500 allocations from node 0, the next 200 allocations from node 1, and the final 50 of the 500 from node 2. All such allocations are subject to availability of page frames in the memory nodes, and all such allocations are implemented without regard to the quantity of memory allocated. In particular in the example of FIG. 5, allocating (710) memory from a node as a proportion of a total number of memory allocations also includes allocating (730) the proportion (724) of a total number of memory allocations from memory on the node, subject to page frame availability. Whether unallocated page frames exist on a memory node may be determined by use of page frame table (424). Page frame table (424) associates page frame numbers (428) for page frames in memory nodes with allocations flags (426) that indicate whether a page frame of memory is allocated.

Allocating (730) the proportion (724) of a total number of memory allocations according to the method of FIG. 5 may be carried out by storing the page frame numbers (428) of all unallocated page frames from a memory node up to and including the proportion (724) of a total number of memory allocations for the memory node into page table (432) for a process running on a processor node. Each record of page table (432) of FIG. 5 associates a page frame number (434) of a page frame on a memory node with a page number (436) in the virtual memory space allocated to a process running on a processor node. In the example of FIG. 5, therefore, page frame number '1593' representing a page frame from a memory node with an evaluated memory affinity (here, a weighted memory affinity to a processor node has been allocated to page number '1348' in page table (432) as indicated by arrow (440).

After allocating the proportion (724) of a total number of memory allocations from the memory node, or after allocating all unallocated page frames from a memory node, whichever comes first, the method of FIG. 5 continues (732) by looping to the next entry in the memory affinity table (402) associated with a memory node and, again, calculating (712) from a weighted coefficient of memory affinity (502) for a node a proportion (724) of a total number of memory allocations, allocating (730) the calculated proportion (724) of a total number of memory allocations from memory on the node, subject to page frame availability, and so on until allocation, subject to page frame availability, of the proportion (724) of a total number of memory allocations for each memory node with an evaluated memory affinity (502) for the processor node for which memory is to be allocated occurs. Upon allocating, subject to page frame availability, the proportion (724) of a total number of memory allocations for each memory node with an evaluated memory affinity (502) for the processor node for which memory is to be allocated, any portion of the total number of allocations remaining unallocated may be satisfied, according to the method of FIG. 5, from memory anywhere on the system regardless of memory affinity.

Figure 6:
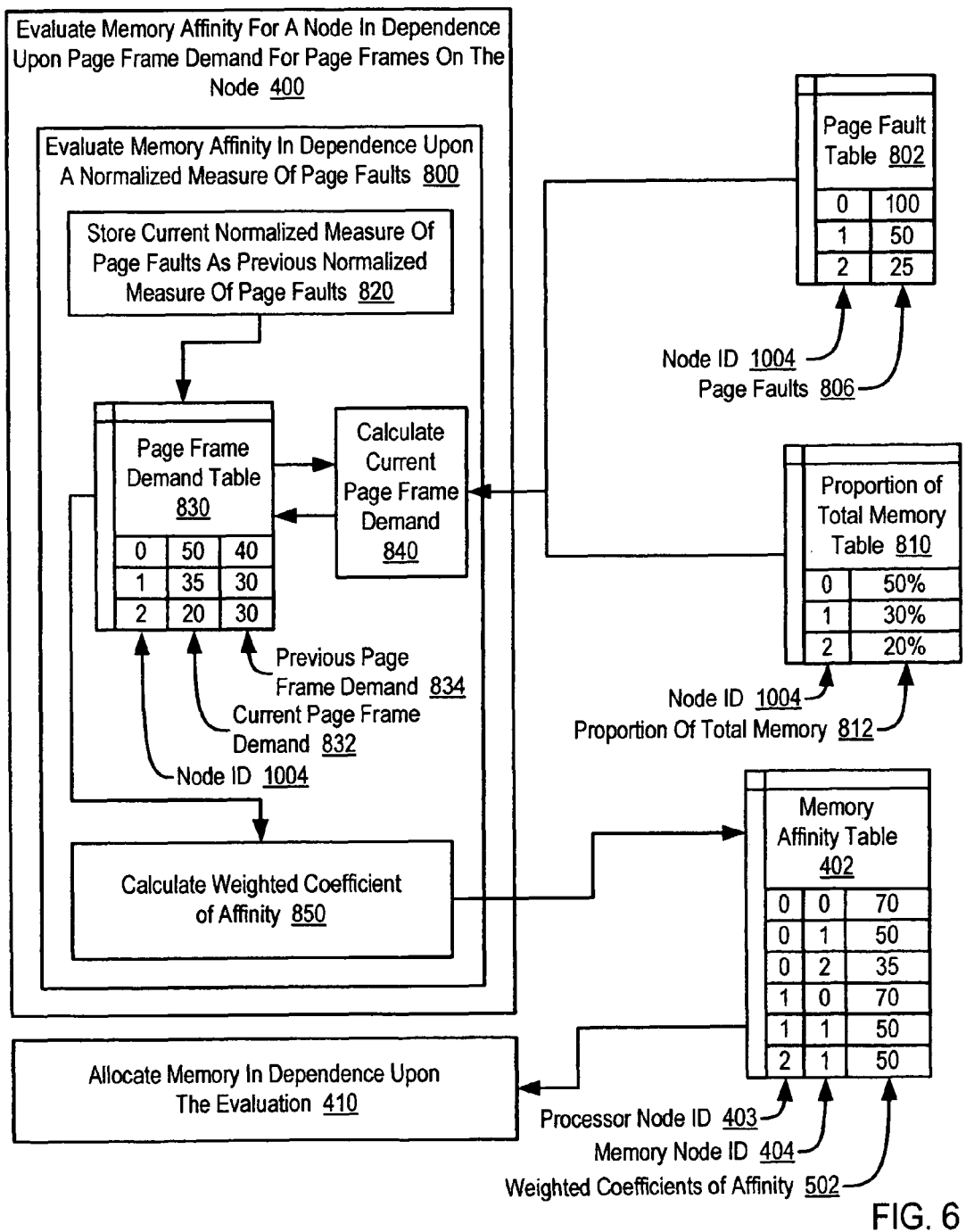
FIG. 6 sets forth a flow chart illustrating a further exemplary method for memory allocation in a multi-node computer according to embodiments of the present invention.

For further explanation, FIG. 6 sets forth a flow chart illustrating a further exemplary method for memory allocation in a multi-node computer according to embodiments of the present invention that includes evaluating (400) memory affinity for a node in dependence upon page frame demand for page frames on the node and allocating (410) memory in dependence upon the evaluation. Evaluating (400) memory affinity for a node in dependence upon page frame demand for page frames on the node according to the method of FIG. 6 includes evaluating (800) memory affinity in dependence upon a normalized measure of page faults. A page fault is an interrupt triggered by a memory management unit ('MMU') in response to a request from a process for memory access to a page in virtual memory that is not mapped to a page frame in RAM. The lack of a mapped page frame for a page of virtual memory may be indicated, for example, by an empty bit set to TRUE for the virtual memory page in a page table. In typical operating systems, a page fault interrupt handler maps a free page frame from a node to a page in virtual memory if a free frame is available. A normalized measure of page faults may be calculated as a number of page faults occurring within a predetermined time interval that map page frames on a node to pages in virtual memory multiplied by a normalizing factor such as, for example, the proportion of memory installed on other nodes relative to the memory installed on all the nodes of the system.

In the method of FIG. 6, evaluating (800) memory affinity in dependence upon a normalized measure of page faults may be carried out periodically at predetermined time intervals such as, for example, every second. Periodically evaluating (800) memory affinity allows evaluations of affinity, such as the weighted coefficients of affinity at reference (502) to adjust dynamically as the page frame demand for page frames on a node changes.

Evaluating (800) memory affinity in dependence upon a normalized measure of page faults according to the method of FIG. 6 includes storing (820) a current normalized measure of page faults as a previous normalized measure of page faults for a node in a page frame demand table (830). Each record of the page frame demand table (830) associates a current page frame demand (832) and a previous page frame demand (834) with a node identifier (1004). The current page frame demand (832) of FIG. 6 is the normalized measure of page faults occurring in the most recently completed predetermined time interval. The previous page frame demand (834) of FIG. 6 is the normalized measure of page faults occurring in the time interval prior to the most recently completed predetermined time interval. Consider, for example, node 0 in a computer system that has an equal distribution of memory among all nodes and that operates according to the method of FIG. 6 where 10 page faults occur in the first time interval, 15 page faults occur in the second time interval, and 12 page faults occur in the third time interval. The most recently completed predetermined time interval while the third time interval elapses is the second time interval. The current page frame demand for node 0 therefore is 15. The time interval prior to the most recently completed predetermined time interval while the third time interval elapses is the first time interval. The previous page frame demand for node 0 therefore is 10.

In the method of FIG. 6, evaluating (800) memory affinity in dependence upon a normalized measure of page faults also includes calculating (840) a current page frame demand. Calculating (840) a current page frame demand according to the method of FIG. 6 may be carried out by calculating a current normalized measure of page faults and storing the current normalized measure of page faults (832) for a node in the current page frame demand (832) of page frame demand table (830). A current normalized measure of page faults may be calculated according to the following Formula 1:

$$N_i = F_i(1-M_i)$$    Formula 1 where $N_i$ is the normalized measure of page faults for the $i^{th}$ memory node, $F_i$ is the number of page faults occurring within the most recently completed predetermined time interval that map page frames from the $i_{th}$ memory node to pages in the virtual memory, and $M_i$ is the proportion of memory installed on the $i^{th}$ memory node relative to the total system memory installed on all the nodes. For node 0, for example, a normalized measure of page faults $N_i$ may be calculated according to Formula 1 where the number of page faults occurring within a predetermined time period that map page frames from node 0 to pages in the virtual memory is taken from column (806) of table (802) as 100, the proportion of memory installed on node 0 relative to the total system memory installed on all the nodes is taken from column (812) of table (810) as 0.50, and $N_i$ is calculated as 50=100(1−0.50).

The page fault table (802) of FIG. 6 associates the number of page faults (806) occurring within a predetermined time period with a node identifier (1004). In this example, 100 page faults have mapped page frames from node 0 to pages in virtual memory, 50 page faults have mapped page frames from node 1 to pages in virtual memory, and 25 page faults have mapped page frames from node 2 to pages in virtual memory.

The proportions of total memory table (810) of FIG. 6 associates the proportion (812) of total system memory installed on a node with a node identifier (1004). In this example, node 0 contains 50% of the total system memory, node 1 contains 30% of the total system memory, and node 2 contains 20% of the total system memory.

In the method of FIG. 6, evaluating (800) memory affinity in dependence upon a normalized measure of page faults further includes calculating (850) a weighted coefficient of memory affinity (502) between a processor node and memory nodes installed on the system according to the following Formula 2:

$$W_i = \frac{P_i}{2} + C_i \qquad \text{Formula 2}$$

where $W_i$ is the weighted coefficient of memory affinity (502) for a processor node for the $i^{th}$ memory node, $P_i$ is the previous page frame demand (834) of the $i^{th}$ memory node, and $C_i$ is the current page frame demand (832) of the $i^{th}$ memory node. For node 0, for example, a weighted coefficient of memory affinity (502) $W_i$ may be calculated according to Formula 2 where the previous page frame demand is taken from column (834) of table (830) as 40, the current page frame demand is taken from column (832) of table (830) as 50, and $W_i$ is calculated as 70=(40÷2)+50.

In the method of FIG. 6, calculating (850) a weighted coefficient of memory affinity (502) may include storing a weighted coefficient of memory affinity (502) for each memory node in a memory affinity table (402). Each record of memory affinity table (402) specifies an evaluation (502) of memory affinity for a memory node (404) for a processor node (403).

The method of FIG. 6 also includes allocating (410) memory in dependence upon the evaluation of memory affinity. Allocating (410) memory in dependence upon the evaluation may be carried out by determining whether there are any memory nodes in the system having evaluated affinities with a processor node, identifying the memory node with the lowest weighted coefficient of affinity, and determining whether the node with lowest weighted coefficient of affinity has unallocated page frames, and so on, as described in detail above in this specification.

Figure 7:
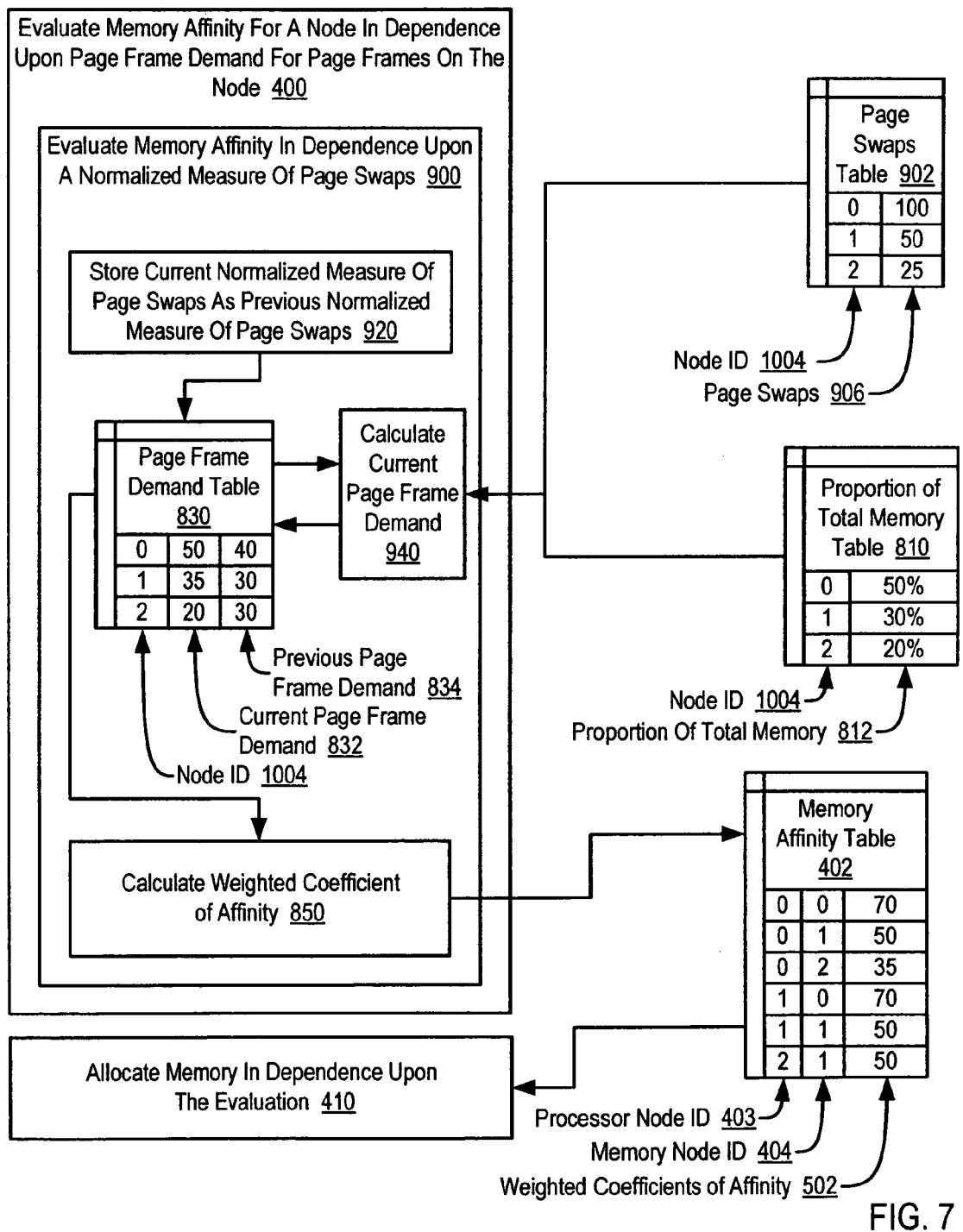
FIG. 7 sets forth a flow chart illustrating a further exemplary method for memory allocation in a multi-node computer according to embodiments of the present invention.

For further explanation, FIG. 7 sets forth a flow chart illustrating a further exemplary method for memory allocation in a multi-node computer according to embodiments of the present invention that includes evaluating (400) memory affinity for a node in dependence upon page frame demand for page frames on the node and allocating (410) memory in dependence upon the evaluation. Evaluating (400) memory affinity for a node in dependence upon page frame demand for page frames on the node according to the method of FIG. 7 includes evaluating (900) memory affinity in dependence upon a normalized measure of page swaps.

A page swap is an allocation of a new page frame to a virtual memory page to which a page frame is already allocated. In order to so allocate the new page frame, the page swap first writes the contents of the previously allocated page frame to disk. A page swap therefore is very expensive in terms of processing time, and page fault handlers typically implement page swaps only when there is no other way to effect an allocation of memory, because, for example, RAM is very full, with no free frames at all or no free frames that can be allocated within a current memory affinity enforcement policy. For these reasons, measures of page swaps may be useful measures of page frame demand: when many page swaps occur on a memory node, page frame demand on the node is high. A normalized measure of page swaps may be implemented as a count of a number of page swaps of memory on a node that occurs within a predetermined period of time multiplied by a normalizing factor such as, for example, a proportion of memory installed on other nodes relative to the total memory installed on all nodes of a system.

In the method of FIG. 7, evaluating (900) memory affinity in dependence upon a normalized measure of page swaps may be carried out periodically at predetermined time intervals such as, for example, every second. Periodically evaluating (900) memory affinity allows evaluations of affinity, such as the weighted coefficients of affinity at reference (502), to adjust dynamically as the page frame demand for page frames on a node changes.

Evaluating (900) memory affinity in dependence upon a normalized measure of page swaps according to the method of FIG. 7 includes storing (920) a current normalized measure of page swaps as a previous normalized measure of page swaps for a node in a page frame demand table (830). Each record of the page frame demand table (830) associates a current page frame demand (832) and a previous page frame demand (834) with a node identifier (1004). The current page frame demand (832) of FIG. 7 is the normalized measure of page swaps occurring in the most recently completed predetermined time interval. The previous page frame demand (834) of FIG. 7 is the normalized measure of page swaps occurring in the time interval prior to the most recently completed predetermined time interval. Consider, for example, node 0 in a computer system that has an equal distribution of memory among all nodes and that operates according to the method of FIG. 7 where 10 page swaps occur in the first time interval, 15 page swaps occur in the second time interval, and 12 page swaps occur in the third time interval. The most recently completed predetermined time interval while the third time interval elapses is the second time interval. The current page frame demand for node 0 therefore is 15. The time interval prior to the most recently completed predetermined time interval while the third time interval elapses is the first time interval. The previous page frame demand for node 0 therefore is 10.

In the method of FIG. 7, evaluating (900) memory affinity in dependence upon a normalized measure of page swaps also includes calculating (940) a current page frame demand. Calculating (940) a current page frame demand according to the method of FIG. 7 may be carried out by calculating a current normalized measure of page swaps and storing the current normalized measure of page swaps for a node in the current page frame demand (832) of page frame demand table (830). A current normalized measure of page swaps may be calculated according to the following Formula 3:

$$N_i = S_i(1-M_i) \qquad \text{Formula 3}$$

where $N_i$ is the normalized measure of page swaps for the $i^{th}$ memory node, $S_i$ is the number of page swaps occurring within the most recently completed predetermined time interval that map page frames from the $i^{th}$ memory node to pages in the virtual memory, and $M_i$ is the proportion of memory installed on the $i^{th}$ memory node relative to the total system memory installed on all the nodes. For node 0, for example, a normalized measure of page swaps $N_i$ may be calculated according to Formula 3 where the number of page swaps occurring within a predetermined time period that map page frames from node 0 to pages in the virtual memory is taken from column (906) of table (902) as 100, the proportion of memory installed on node 0 relative to the total system memory installed on all the nodes is taken from column (812) of table (810) as 0.50, and $N_i$ is calculated as 50=100(1−0.50).

The page swap table (902) of FIG. 7 associates the number of page swaps (906) occurring within a predetermined time period with a node identifier (1004). In this example, 100 page swaps have created free page frames on node 0 available for mapping into pages of virtual memory, 50 page swaps have created free page frames on node 1 available for mapping into pages of virtual memory, and 25 page swaps have created free page frames on node 2 available for mapping into pages of virtual memory.

The proportions of total memory table (810) of FIG. 7 associates the proportion (812) of total system memory installed on a node with a node identifier (1004). In this example, node 0 contains 50% of the total system memory, node 1 contains 30% of the total system memory, and node 2 contains 20% of the total system memory.

In the method of FIG. 7, evaluating (900) memory affinity in dependence upon a normalized measure of page swaps further includes calculating (850) a weighted coefficient of memory affinity (502) between a processor node and memory nodes installed on the system according to the following Formula 4:

$$W_i = \frac{P_i}{2} + C_i \qquad \text{Formula 4}$$

where $W_i$ is the weighted coefficient of memory affinity (502) for a processor node for the $i^{th}$ memory node, $P_i$ is the previous page frame demand (834) of the $i^{th}$ memory node, and $C_i$ is the current page frame demand (832) of the $i^{th}$ memory node. For node 0, for example, a weighted coefficient of memory affinity (502) $W_i$ may be calculated according to Formula 4 where the previous page frame demand is taken from column (834) of table (830) as 40, the current page frame demand is taken from column (832) of table (830) as 50, and $W_i$ is calculated as 70=(40÷2)+50.

In the method of FIG. 7, calculating (850) a weighted coefficient of memory affinity (502) may include storing a weighted coefficient of memory affinity (502) for each memory node in a memory affinity table (402). Each record of memory affinity table (402) specifies an evaluation (502) of memory affinity for a memory node (404) for a processor node (403).

The method of FIG. 7 also includes allocating (410) memory in dependence upon the evaluation of memory affinity. Allocating (410) memory in dependence upon the evaluation may be carried out by determining whether there are any memory nodes in the system having evaluated affinities with a processor node, identifying the memory node with the lowest weighted coefficient of affinity, and determining whether the node with lowest weighted coefficient of affinity has unallocated page frames, and so on, as described in detail above in this specification.

Figure 8:
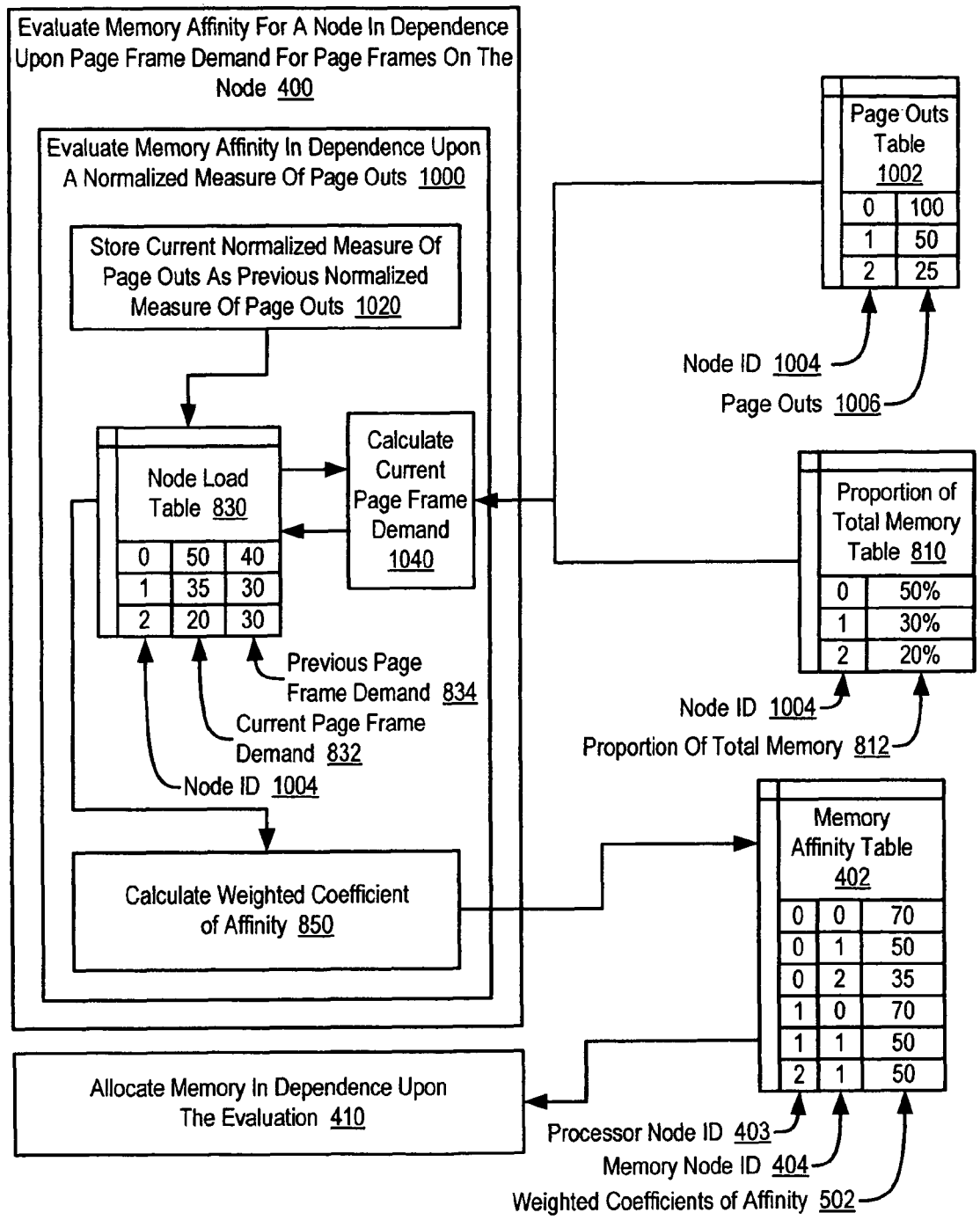
FIG. 8 sets forth a flow chart illustrating a further exemplary method for memory allocation in a multi-node computer according to embodiments of the present invention.

For further explanation, FIG. 8 sets forth a flow chart illustrating a further exemplary method for memory allocation in a multi-node computer according to embodiments of the present invention that includes evaluating (400) memory affinity for a node in dependence upon page frame demand for page frames on the node and allocating (410) memory in dependence upon the evaluation. Evaluating (400) memory affinity for a node in dependence upon page frame demand for page frames on the node according to the method of FIG. 8 includes evaluating (1000) memory affinity in dependence upon a normalized measure of page outs.

A 'page out' is a process that stores to disk the contents of a page frame in RAM and marks as empty in a page table the virtual page to which the page frame was mapped—thereby freeing the page frame for reallocation. A page out process may also mark the frame as free in a frame table or list the frame in a free frame table. Because a page out writes page frames to disk, a page out is very expensive in terms of processing time. Page fault handlers therefore typically implement a page out only in the presence of high page frame demand, when, for example, a number of allocated page frames exceeds a predetermined threshold. For these reasons, measures of page outs may be useful measures of page frame demand: when many page outs occur on a memory node, page frame demand on the node is high. A normalized measure of page outs may be implemented as a count of a number of page outs of memory on a node that occurs within a predetermined period of time multiplied by a normalizing factor such as, for example, a proportion of memory installed on other nodes relative to the total memory installed on all nodes of a system.

In the method of FIG. 8, evaluating (1000) memory affinity in dependence upon a normalized measure of page outs may be carried out periodically at predetermined time intervals such as, for example, every second. Periodically evaluating (1000) memory affinity allows evaluations of affinity, such as the weighted coefficients of affinity at reference (502), to adjust dynamically as the page frame demand for page frames on a node changes.

Evaluating (1000) memory affinity in dependence upon a normalized measure of page outs according to the method of FIG. 8 includes storing (1020) a current normalized measure of page outs as a previous normalized measure of page outs for a node in a page frame demand table (830). Each record of the page frame demand table (830) associates a current page frame demand (832) and a previous page frame demand (834) with a node identifier (1004). The current page frame demand (832) of FIG. 8 is the normalized measure of page outs occurring in the most recently completed predetermined time interval. The previous page frame demand (834) of FIG. 8 is the normalized measure of page outs occurring in the time interval prior to the most recently completed predetermined time interval.

In the method of FIG. 8, evaluating (1000) memory affinity in dependence upon a normalized measure of page outs also includes calculating (1040) a current page frame demand. Calculating (1040) a current page frame demand according to the method of FIG. 8 may be carried out by calculating a current normalized measure of page outs and storing the current normalized measure of page outs for a node in the current page frame demand (832) of page frame demand table (830). A current normalized measure of page outs may be calculated according to the following Formula 5:

$$N_i = O_i(1-M_i) \qquad \text{Formula 5}$$

where $N_i$ is the normalized measure of page outs for the $i^{th}$ memory node, $O_i$ is the number of page outs occurring within the most recently completed predetermined time interval that map page frames from the $i^{th}$ memory node to pages in the virtual memory, and $M_i$ is the proportion of memory installed on the $i^{th}$ memory node relative to the total system memory installed on all the nodes. For node 0, for example, a normalized measure of page outs $N_i$ may be calculated according to Formula 5 where the number of page outs occurring within a predetermined time period that map page frames from node 0 to pages in the virtual memory is taken from column (1006) of table (1002) as 100, the proportion of memory installed on node 0 relative to the total system memory installed on all the nodes is taken from column (812) of table (810) as 0.50, and $N_i$ is calculated as 50=100(1−0.50).

The page out table (1002) of FIG. 8 associates the number of page outs (1006) occurring within a predetermined time period with a node identifier (1004). In this example, 100 page outs have created free page frames on node 0 available for mapping into pages of virtual memory, 50 page outs have created free page frames on node 1 available for mapping into pages of virtual memory, and 25 page outs have created free page frames on node 2 available for mapping into pages of virtual memory.

The proportions of total memory table (810) of FIG. 8 associates the proportion (812) of total system memory installed on a node with a node identifier (1004). In this example, node 0 contains 50% of the total system memory, node 1 contains 30% of the total system memory, and node 2 contains 20% of the total system memory.

In the method of FIG. 8, evaluating (1000) memory affinity in dependence upon a normalized measure of page outs further includes calculating (850) a weighted coefficient of memory affinity (502) between a processor node and memory nodes installed on the system according to the following Formula 6:

$$W_i = \frac{P_i}{2} + C_i \qquad \text{Formula 6}$$

where $W_i$ is the weighted coefficient of memory affinity (502) for a processor node for the $i^{th}$ memory node, $P_i$ is the previous page frame demand (834) of the $i^{th}$ memory node, and $C_i$ is the current page frame demand (832) of the $i^{th}$ memory node. For node 0, for example, a weighted coefficient of memory affinity (502) $W_i$ may be calculated according to Formula 6 where the previous page frame demand is taken from column (834) of table (830) as 40, the current page frame demand is taken from column (832) of table (830) as 50, and $W_i$ is calculated as 70=(40÷2)+50.

In the method of FIG. 8, calculating (850) a weighted coefficient of memory affinity (502) may include storing a weighted coefficient of memory affinity (502) for each memory node in a memory affinity table (402). Each record of memory affinity table (402) specifies an evaluation (502) of memory affinity for a memory node (404) for a processor node (403).

The method of FIG. 8 also includes allocating (410) memory in dependence upon the evaluation of memory affinity. Allocating (410) memory in dependence upon the evaluation may be carried out by determining whether there are any memory nodes in the system having evaluated affinities with a processor node, identifying the memory node with the lowest weighted coefficient of affinity, and determining whether the node with lowest weighted coefficient of affinity has unallocated page frames, and so on, as described in detail above in this specification.

Exemplary embodiments of the present invention are described largely in the context of a fully functional computer system for memory allocation in a multi-node computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for memory allocation in a multi-node computer, the method comprising:
    evaluating, a plurality of times throughout operation of the multi-node computer, memory affinity for a node in dependence upon page frame demand for page frames on the node, including:
        calculating a normalized measure of page faults including multiplying a measure of page faults by a normalizing factor, wherein the normalizing factor is the proportion of memory installed on other nodes relative to the memory installed on all the nodes of the system;
        evaluating memory affinity in dependence upon the normalized measure of page faults, wherein a page fault is an interrupt triggered by a memory management unit ('MMU') in response to a request from a process for memory access to a page in virtual memory that is not mapped to a page frame in memory; and
        calculating, in dependence upon the normalized measure of page faults, a weighted coefficient of memory affinity, the weighted coefficient representing desirability of allocating memory from the node; and
    allocating, for each evaluation dynamically throughout operation of the multi-node computer in dependence upon the weighted coefficient of memory affinity, memory.

2. The method of claim 1 wherein allocating memory further comprises allocating memory from the node as a proportion of a total quantity of memory to be allocated.

3. The method of claim 1 wherein allocating memory further comprises allocating memory from the node as a proportion of a total number of memory allocations.

4. The method of claim 1 wherein evaluating memory affinity for a node further comprises evaluating memory affinity in dependence upon a normalized measure of page swaps.

5. The method of claim 1 wherein evaluating memory affinity for a node further comprises evaluating memory affinity in dependence upon a normalized measure of page outs.

6. An apparatus for memory allocation in a multi-node computer, the apparatus comprising a multiplicity of computer processors and computer memory operatively coupled to the computer processors, the computer memory having disposed within it computer program instructions capable of:
    evaluating, a plurality of times throughout operation of the multi-node computer, memory affinity for a node in dependence upon page frame demand for page frames on the node, including:
        calculating a normalized measure of page faults including multiplying a measure of page faults by a normalizing factor, wherein the normalizing factor is the proportion of memory installed on other nodes relative to the memory installed on all the nodes of the system;

evaluating memory affinity in dependence upon the normalized measure of page faults, wherein a page fault is an interrupt triggered by a memory management unit ('MMU') in response to a request from a process for memory access to a page in virtual memory that is not mapped to a page frame in memory; and calculating, in dependence upon the normalized measure of page faults, a weighted coefficient of memory affinity, the weighted coefficient representing desirability of allocating memory from the node; and allocating, for each evaluation dynamically throughout operation of the multi-node computer in dependence upon the weighted coefficient of memory affinity, memory.

7. The apparatus of claim 6 wherein allocating memory further comprises allocating memory from the node as a proportion of a total quantity of memory to be allocated.

8. The apparatus of claim 6 wherein allocating memory further comprises allocating memory from the node as a proportion of a total number of memory allocations.

9. A computer program product for memory allocation in a multi-node computer, the computer program product disposed upon a non-transitory computer readable medium, the computer program product comprising computer program instructions capable of:

evaluating, a plurality of times throughout operation of the multi-node computer, memory affinity for a node in dependence upon page frame demand for page frames on the node, including:

calculating a normalized measure of page faults including multiplying a measure of page faults by a normalizing factor, wherein the normalizing factor is the proportion of memory installed on other nodes relative to the memory installed on all the nodes of the system;

evaluating memory affinity in dependence upon the normalized measure of page faults, wherein a page fault is an interrupt triggered by a memory management unit ('MMU') in response to a request from a process for memory access to a page in virtual memory that is not mapped to a page frame in memory; and calculating, in dependence upon the normalized measure of page faults, a weighted coefficient of memory affinity, the weighted coefficient representing desirability of allocating memory from the node; and allocating, for each evaluation dynamically throughout operation of the multi-node computer in dependence upon the weighted coefficient of memory affinity, memory.

10. The computer program product of claim 9 wherein allocating memory further comprises allocating memory from the node as a proportion of a total quantity of memory to be allocated.

11. The computer program product of claim 9 wherein allocating memory further comprises allocating memory from the node as a proportion of a total number of memory allocations.

12. The computer program product of claim 9 wherein evaluating memory affinity for a node further comprises evaluating memory affinity in dependence upon a normalized measure of page swaps.

13. The computer program product of claim 9 wherein evaluating memory affinity for a node further comprises evaluating memory affinity in dependence upon a normalized measure of page outs.

* * * * *